(12) United States Patent
Tsubouchi et al.

(10) Patent No.: US 7,089,846 B2
(45) Date of Patent: Aug. 15, 2006

(54) NEGATIVE PRESSURE TYPE BOOSTER DEVICE

(75) Inventors: Kaoru Tsubouchi, Toyota (JP); Nobuyuki Hirota, Nishikamo-gun (JP); Kenichi Kobayashi, Nagoya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/840,785

(22) Filed: May 7, 2004

(65) Prior Publication Data

US 2004/0255770 A1 Dec. 23, 2004

(30) Foreign Application Priority Data

Jun. 3, 2003 (JP) ............................. 2003-158313

(51) Int. Cl.
*F15B 9/10* (2006.01)
(52) U.S. Cl. .................................... 91/369.2; 91/376 R
(58) Field of Classification Search .............. 91/376 R, 91/369.2, 369.3
See application file for complete search history.

(56) References Cited

U.S. PATENT DOCUMENTS

| | | | | |
|---|---|---|---|---|
| 4,633,760 A | * | 1/1987 | Wagner | 91/369.2 |
| 5,483,866 A | * | 1/1996 | Schluter | 91/376 R |
| 5,839,344 A | * | 11/1998 | Tsubouchi | 91/376 R |
| 6,067,891 A | * | 5/2000 | Gautier et al. | 91/376 R |
| 6,389,951 B1 | * | 5/2002 | Castel et al. | 91/376 R |
| 6,755,116 B1 | * | 6/2004 | Tsubouchi et al. | 91/369.2 |

FOREIGN PATENT DOCUMENTS

EP 1 227 020 A1 7/2002

* cited by examiner

*Primary Examiner*—Edward K. Look
*Assistant Examiner*—Michael Leslie
(74) *Attorney, Agent, or Firm*—Buchanan Ingersoll PC

(57) ABSTRACT

A negative pressure type booster device possesses a valve mechanism constructed to compensate for insufficient depressing force applied to a brake pedal upon emergency braking. Upon depression of the brake pedal, first negative pressure valves contact first negative pressure valve seats to block a variable pressure chamber from communication with a constant pressure chamber, and an atmosphere valve seat is separated from an atmosphere valve to communicate the variable pressure chamber with atmosphere. A partition member thus moves forwards depending on the pressure difference between the chambers to output a propelling force from an output rod. When the brake pedal is stepped on quickly, a valve member is urged backwards by a spring member causing second negative pressure valve seats to contact second negative pressure valves and move the valve member backwards. The atmosphere valve separates from the atmosphere valve seat, and the variable pressure chamber quickly communicates with atmosphere.

6 Claims, 5 Drawing Sheets

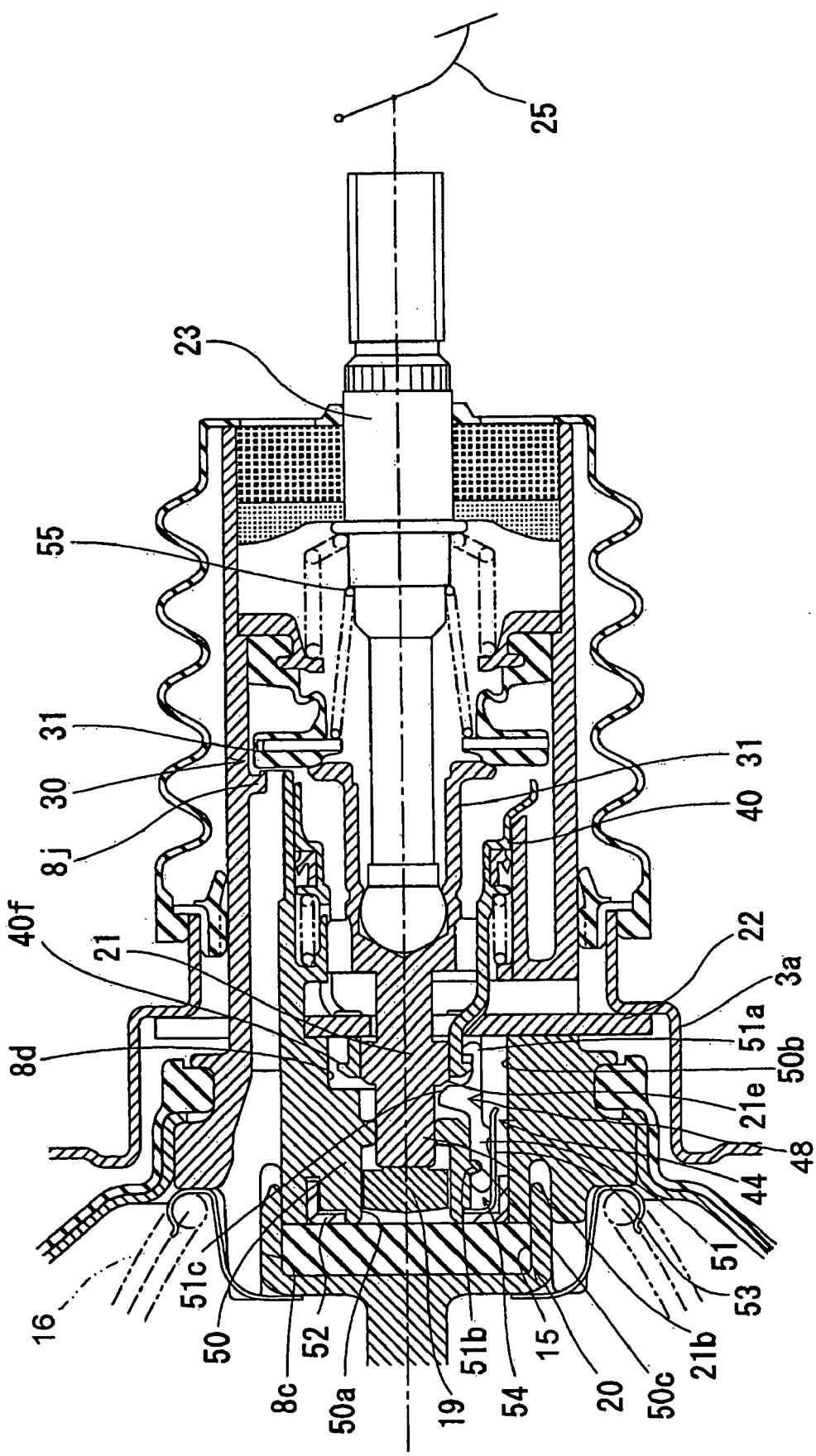

NEGATIVE PRESSURE TYPE BOOSTER DEVICE

INCORPORATION BY REFERENCE

This application is based on and claims priority under 35 U.S.C. sctn. 119 with respect to Japanese Application No. 2003-158313 filed on Jun. 3, 2003, the entire content of which is incorporated herein by reference.

BACKGROUND OF THE INVENTION

1. Field of the Invention

The present invention relates to a negative pressure type booster device for motor vehicles and particularly, to a negative pressure type booster device capable of compensating for the insufficient stepping force exerted on a brake pedal at the time of emergency braking.

2. Discussion of the Related Art

Heretofore, the result of a certain analysis has taught that at the time of emergency braking wherein the driver quickly steps a brake pedal in the event of the sudden emergence of an obstacle or block on the course of the vehicle, it is often the case that the braking capability of the vehicle cannot be sufficiently performed because the stepping force the driver exerts on the brake pedal is considerably smaller than that needed to generate the fluid pressure which brings road wheels in lock states. On the basis of the result of such an analysis, there has been developed negative pressure type booster devices which are capable of judging whether the braking applied is an ordinary one or an emergency one from the stepped speed of the brake pedal or the speed in the increase of the fluid pressure of a master cylinder and at the time of the emergency braking, of automatically increasing the brake fluid pressure to the extent that the road wheels are brought into lock. In negative pressure type booster devices capable of assisting the stepping force on a brake pedal at such an emergency braking, for example, in one described in European patent application No. EP 1 227 020 A1, the interior of a booster shell is divided by a partition member into a variable pressure chamber and a constant pressure (i.e., vacuum) chamber, and an output piston of a bottomed, cylindrical shape is secured at its base portion to the partition member. The movement in the forward and backward direction of the partition member caused by the pressure difference between the both chambers is transmitted from the output piston to an output rod through a reaction mechanism. A plunger operated in connection with the reaction mechanism is connected to an input rod axially movable by a brake pedal. The output piston is provided with a small-diameter hole and a large-diameter hole respectively at a base end side and an open end side, and a negative pressure valve seat is annularly protruded along the internal surface at a stepped portion between the small and large-diameter holes. Passages communicating with the constant pressure chamber open at a shoulder surface of the stepped portion diametrically outside of the negative pressure valve seat, and an atmosphere valve seat is annularly formed at the rear end surface of the plunger at a position behind the negative pressure valve seat to encircle an air leading passage. A cylindrical valve member which is constituted by joining forward and rear walls with an outer circumferential wall thereby to take a U-shape in the half cross-section is received in the output piston movably in the forward and backward direction. The cylindrical valve member is provided at front end surfaces of the forward and rear walls with a negative pressure valve and an atmosphere valve, which are contactable respectively with the negative pressure valve seat and the atmosphere valve seat for bringing the variable pressure chamber selectively into communication with either of the constant pressure chamber and the atmosphere or isolation therefrom. The cylindrical valve member is urged forward by means of a compression spring.

Further, a cylindrical valve seat member encircling the plunger is air-tightly inserted into the small-diameter hole of the output piston to be slidable in the axial direction, and a second negative pressure valve seat is formed at the rear end of the valve seat member radially inside of the negative pressure valve seat. A second negative pressure valve contactable with the second negative pressure valve seat is provided on the forward end surface of the cylindrical valve member, and passages are provided on the lateral sides of the output piston and the valve seat member for making the inside of the valve seat member communicate with the variable pressure chamber. The valve seat member is urged backward by means of a spring member so that the second negative pressure valve seat comes closer to the cylindrical valve member than the negative pressure valve seat do. Latch means is provided on the base portion of the output piston for latching the valve seat member at an ordinary position against the resilient force of the spring member so that the second negative pressure valve seat is separated forward from the cylindrical valve member.

In the known device of the aforementioned construction, when the brake pedal is quickly stepped on to advance the plunger beyond a predetermined distance relative to the output piston, the latch means releases the valve seat member, whereby the second negative pressure valve seat is brought into contact with the second negative pressure valve formed on the front end wall of the cylindrical valve member thereby to move the same backward. This causes the atmosphere valve to be separated from the atmosphere valve seat, so that the variable pressure chamber is brought quickly and compulsorily into communication with the atmosphere. As a consequence, a larger propelling force than that in the ordinary state is output to the output member, so that it can be realized to generate a sufficiently high fluid pressure in the master cylinder. At the moment that the brake pedal is stepped on, the ratio of the output to the input becomes the infinity until the plunger comes into contact with the reaction member, and the resultant output characteristic indicates a jumping characteristic wherein the output increases on a step-by-step basis. At the time of emergency braking, the latch means releases the valve seat member and permits the second negative pressure valve seat to come into contact with the second negative pressure valve thereby to push the cylindrical valve member backward. This causes the jumping characteristic to become more notable than that at the time of the ordinary braking, whereby a larger propelling force than that at the time of the ordinary braking is output to the output member. That is, the latching and releasing of the valve seat member by the latch means makes it possible to selectively switch the two kinds of the input-output characteristics for the ordinary braking as well as for the emergency braking. When the brake pedal is released, the plunger is brought into the state that it does not advance more than the predetermined distance relative to the output piston. This causes the valve seat member to advance relative to the output piston, whereby the valve seat member is latched by the latch means to the ordinary position.

When the latch means releases the valve seat member at the time of the emergency braking, the valve seat member is moved backward by means of the spring member, and therefore, the cylindrical valve member has to be moved backward quickly through the contact of the second negative pressure valve seat with the second negative pressure valve. For this purpose, the cylindrical valve member is to be downsized and lightened, and the resistance against the movement of the cylindrical valve member is to be diminished. However, the known device of the aforementioned construction is advantageous in that the cylindrical valve member of a U-shape in the half cross-section is constructed to have a smaller resistance against the movement thereof by being provided with the negative pressure valve and the atmosphere valve respectively annually on the forward end surfaces of the front and rear walls thereof, but has drawbacks in that the cylindrical valve member becomes complicated and elongated in the axial direction to be enlarged as well as to be increased in mass.

Further, in order that the pressure difference between the constant and variable pressure chambers does not cause any propelling force to be exerted on the cylindrical valve member, the area through which the pressure difference acts on the cylindrical valve member has to be small. However, in the prior art device, because the negative pressure valve seat is provided annually to encircle the plunger, the circumferential length of the negative pressure valve seat and the area at which the pressure difference between the constant and variable pressure chambers acts on the cylindrical valve member cannot be set or designed independently of the diameter of the atmosphere valve seat, and it may be the case on occasion that the air discharge from the variable pressure chamber to the constant pressure chamber is not highly responsive and silent.

In addition, the prior art device of the aforementioned construction is complicated in the shapes of those components which constitute a mechanism for increasing the output at the time of the emergency braking, and therefore, is low in productivity.

SUMMARY OF THE INVENTION

Accordingly, it is a primary object of the present invention to provide a negative pressure type booster device which is simplified in the construction of a valve mechanism or, in particular, of a valve member and which is capable of compensating for the insufficient stepping force exerted on a brake pedal at the time of emergency braking.

Briefly, in a negative pressure type booster device according to the present invention, a booster shell has a partition member partitioning the interior thereof into a variable pressure chamber and a constant pressure chamber. An output piston is secured to the partition member at a base portion thereof and has a first negative pressure valve seat formed thereon. A reaction mechanism is provided for transmitting the output depending on the pressure difference between the variable and constant pressure chambers, from the output piston to an output rod. A plunger is operable in connection with the reaction mechanism and has an atmosphere valve seat formed thereon. An input rod is connected to the plunger for axially moving the plunger when axially moved by a brake pedal. A valve member has a first negative pressure valve and an atmosphere valve formed thereon, and the first negative pressure valve is contactable with the first negative pressure valve seat for selective communication of the variable pressure chamber with the constant pressure chamber, while the atmosphere valve is contactable with the atmosphere valve seat for selective communication of the variable pressure chamber with the atmosphere. A valve seat member has a second negative pressure valve seat formed thereon and is inserted air-tightly and slidably into a cylindrical portion which is formed in the output piston at a position ahead of the valve member. A resilient member is provided for urging the valve seat member backward relative to the output piston. The valve member has a second negative pressure valve thereon which is contactable with the second negative pressure valve seat for communication of the variable pressure chamber selectively with the constant pressure chamber or with the atmosphere. Latch means is further provided for latching the valve seat member upon the output piston against the force of the resilient member urging the valve seat member backward when the relative forward distance of the plunger relative to the output piston is smaller than a predetermined value, but for unlatching or releasing the valve seat member from the output piston for power increase at the time of emergency braking when the relative advance distance of the plunger relative to the output piston is larger than the predetermined value. In addition, a passage making communication between the constant pressure chamber and the variable pressure chamber is formed in the cylindrical portion to open at the rear end surface of the cylindrical portion. The first negative pressure valve seat takes a closed loop and protrudes from the rear end surface of the cylindrical portion to encircle the rear end of the passage, and the first negative pressure valve, the second negative pressure valve and the atmosphere valve contactable respectively with the first negative pressure valve seat, the second negative pressure valve seat and the atmosphere valve seat are formed on the valve member to reside almost within a common plane normal to the axis of the output piston.

With this construction, since the first negative pressure valve, the second negative pressure and the atmosphere valve are formed on the valve member to reside almost within the common plane and since the valve member is simplified in construction and is downsized and lightened, the negative pressure type booster device can be downsized and lightened and in particular, can be shortened in its whole axial length. In addition, when the valve seat member is urged backward by the resilient member at the time of the emergency braking, the second negative pressure valve seat is brought into contact with the second negative pressure valve thereby to quickly move the valve member backward. Thus, the atmosphere valve can be separated from the atmosphere valve seat to make the variable pressure chamber communicate with the atmosphere quickly and compulsorily, so that a sufficiently larger fluid pressure than that in the ordinary state can be generated in a master cylinder. Further, since the passage is provided in the cylindrical portion to make the variable pressure chamber communicate with the constant pressure chamber, since the first negative pressure valve seat is protruded in the closed loop shape from the rear end portion where the passage faces the valve member and since the first negative pressure valve contactable with the first negative pressure valve seat is formed on the valve member, the circumferential length of the first negative pressure valve seat and the area through which the pressure difference between the constant pressure chamber and the variable pressure chamber acts on the valve member can be easily set or designed to meet the valve characteristic. Further, since the circumferential length of the first negative pressure valve seat and the area through which the pressure difference between the constant pressure chamber and the variable pressure chamber acts on the valve member can be set or designed independently of the diameter of the atmosphere valve seat and the like, the discharge of the air from the variable pressure chamber to the constant pressure chamber can be performed through the operation which is highly responsive and silent. In addition, it can be realized to set the load at the start to be proper by properly altering the force acting on the valve member, and it can be also realized to perform quick braking operation by decreasing the reaction force which is generated when the valve seat member pushes the valve member backward.

BRIEF DESCRIPTION OF THE
ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which:

FIG. 5 is an enlarged fragmentary sectional view of still another valve mechanism in the third embodiment according to the present invention.

DETAILED DESCRIPTION OF THE
PREFERRED EMBODIMENTS

First Embodiment

Figure 1:
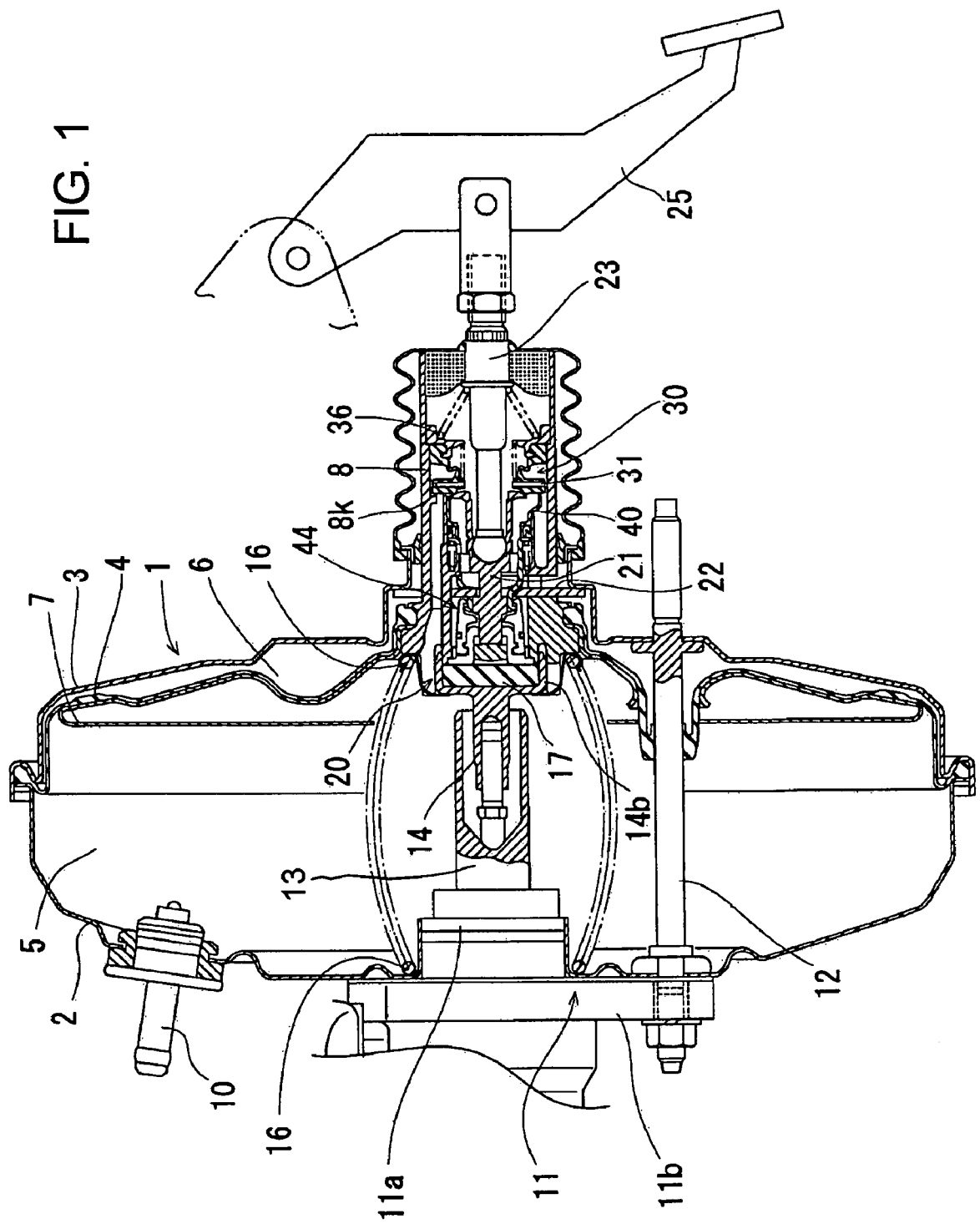
FIG. 1 is a longitudinal sectional view of a negative pressure type booster device in the first embodiment according to the present invention.

A negative pressure type booster device in the first embodiment according to the present invention will be described hereinafter with reference to the accompanying drawings. Referring now to FIG. 1, a booster shell 1 is composed of a front shell 2 and a rear shell 3. Between the both shells 2 and 3, a flexible diaphragm 4 serving as partition member is secured air-tightly at its outer circumferential bead portion and partitions the interior of the booster shell 1 into a constant pressure chamber 5 and a variable pressure chamber 6. A disc-like plate 7 is laminated to the diaphragm 4 within the constant pressure chamber 5. An output piston 8 is air-tightly secured to the diaphragm 4 and the plate 7 at the outer surface of a base portion 8a thereof and exposes the forward end surface within the constant pressure chamber 5. A negative-pressure leading conduit 10 is attached to the front shell 2, and the constant pressure chamber 5 is in communication with an intake manifold of a combustion engine (both not shown) through the negative-pressure leading conduit 10 thereby to be kept at a predetermined negative pressure.

Figure 2:
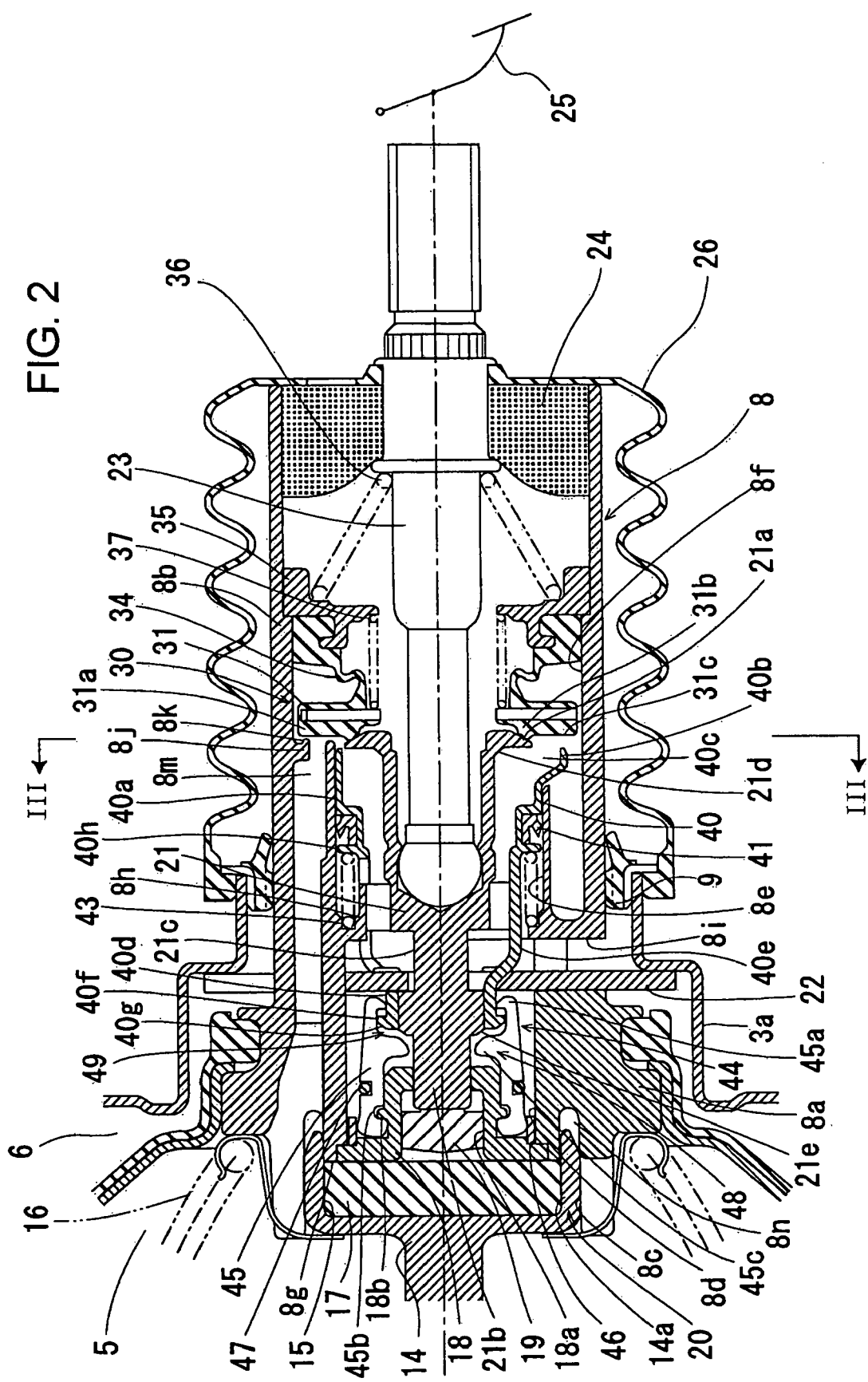
FIG. 2 is an enlarged fragmentary sectional view of a valve mechanism incorporated in the negative pressure type booster device shown in FIG. 1.

As best shown in FIG. 2, the rear shell 3 is bent at its center portion outwardly thereby to protrude a cylindrical protruding portion 3a backward and has a through hole (not numbered) formed to extend on the axis of the rear shell 3. The output piston 8 protrudes a slidable, cylindrical portion 8b backward from the base portion 8a, and the slidable, cylindrical portion 8b passes through the through hole to protrude backward from the protruding portion 3a of the booster shell 1. A sealing element 9 is interposed between the internal surface of the through hole and the outer surface of the slidable, cylindrical portion 8b to isolate the variable pressure chamber 6 air-tightly from the atmosphere.

Referring again to FIG. 1, a numeral 11 denotes a master cylinder, which at its one or rear end portion 11a, passes through a center hole formed at the center portion of the front shell 2 to air-tightly protrude into the constant pressure chamber 5, with a flange portion 11b thereof being in abutting engagement with the forward end surface of the front shell 2. The front shell 2 and the rear shell 3 are joined with each other with several (e.g., two) tie rods 12, each of which extends in parallel with the axis of the booster shell 1 composed of the both shells 2, 3 at almost radial mid position between the axis and the outer surface of the booster shell 1 and is secured to the master cylinder 11. A sliding hole of each sealing portion formed on the diaphragm 4 is fit on each tie rod 12 to be air-tightly slidable therealong as it keeps the air-tight partitioning between the constant pressure chamber 5 and the variable pressure chamber 6.

A numeral 13 denotes a master piston, which is inserted into the master cylinder 11 slidably in the forward and backward direction. The master piston 13 protrudes from the rear end portion of the master cylinder 11 to extend close to the forward end of the output piston 8. An output rod 14 is interposed between the output piston 8 and the master piston 13. The output piston 8 transmits the forward movement of the diaphragm 4 depending on the pressure difference between the constant pressure chamber 5 and the variable pressure chamber 6, to the output rod 14 through a reaction member 17 thereby to cause the output rod 14 to pressure the master piston 13 forward. A return spring 16 is interposed between the front shell 2 and the forward end surface of the output piston 8 to urge the same backward.

As best shown in FIG. 2, a reaction force chamber hole 8c, a latch member receiving hole 8d smaller in diameter than the reaction force chamber hole 8c, a plunger receiving hole 8e and a valve member receiving hole 8f larger in diameter than the plunger receiving hole 8e are formed in series from the forward end surface toward the rear end surface of the output piston 8 on the axis of the same. Between the reaction force chamber hole 8c and the latch member receiving hole 8d, there are provided a cap member or flanged cylindrical member 18, secured to a stepped portion 8g with the forward end surface of a flange portion thereof being aligned to the stepped portion 8g, and an annular recess 8n axially formed to surround the flange of the cylindrical member 18. An annular protrusion 14a formed at the rear end of the output rod 14 is inserted into an annular recess 8n axially slidably relative to the output piston 8 thereby to form a reaction force chamber 15 whose bottom surface is defined by the flange forward surface of the cylindrical member 18 and the stepped portion 8g. A disc-like reaction member 17 made of an elastic material is received in the reaction force chamber 15. Further, a numeral 21 designates a plunger received in the plunger receiving hole 8e movably in the forward and backward direction and having an atmosphere valve seat 21a formed on a rear end surface thereof. A forward end rod portion 21b of the plunger 21 is slidably inserted into the rear wall of the cylindrical member 18 to extend into a reaction force hole 18a and makes the forward end surface thereof face the rear end surface of an abutting member 19, which is slidably received in the reaction force hole 18a.

A numeral 22 denotes a key member taking the shape of "H" letter and serving as a restraining member. Straight portions formed at the opposite sides of the key member 22 have their inner sides which partly get in an annular groove 21c formed on the rod portion 21b of the plunger 21. The straight portions of the key member 22 pass through two rectangular holes 8*i*, which are formed on radially opposite side walls defining the latch member receiving hole 8*d*, as they are guided at outer side surfaces thereof along the rectangular holes 8*i*, and extend both end portions radially outwardly of the output piston 8. Thus, the output piston 8 and the plunger 21 are able to axially move relative to each other by a limited distance which is determined by subtracting double the thickness of the key member 22 from the sum of the widths of the rectangular holes 8*i* and the annular groove 21*c*. The rear end of the plunger 21 is connected to an input rod 23 as the same is swingable relative to the plunger 21. The input rod 23 passes through a filter element 24 to extend backward beyond the slidable, cylindrical portion 8*b* and is connected to a brake pedal 25 in a usual manner. A bellows 26 is secured at forward and rear ends thereof respectively to the protruding portion 3*a* of the rear shell 3 and the input rod 23 to cover the slidable, cylindrical portion 8*b* of the output piston 8.

Figure 3:
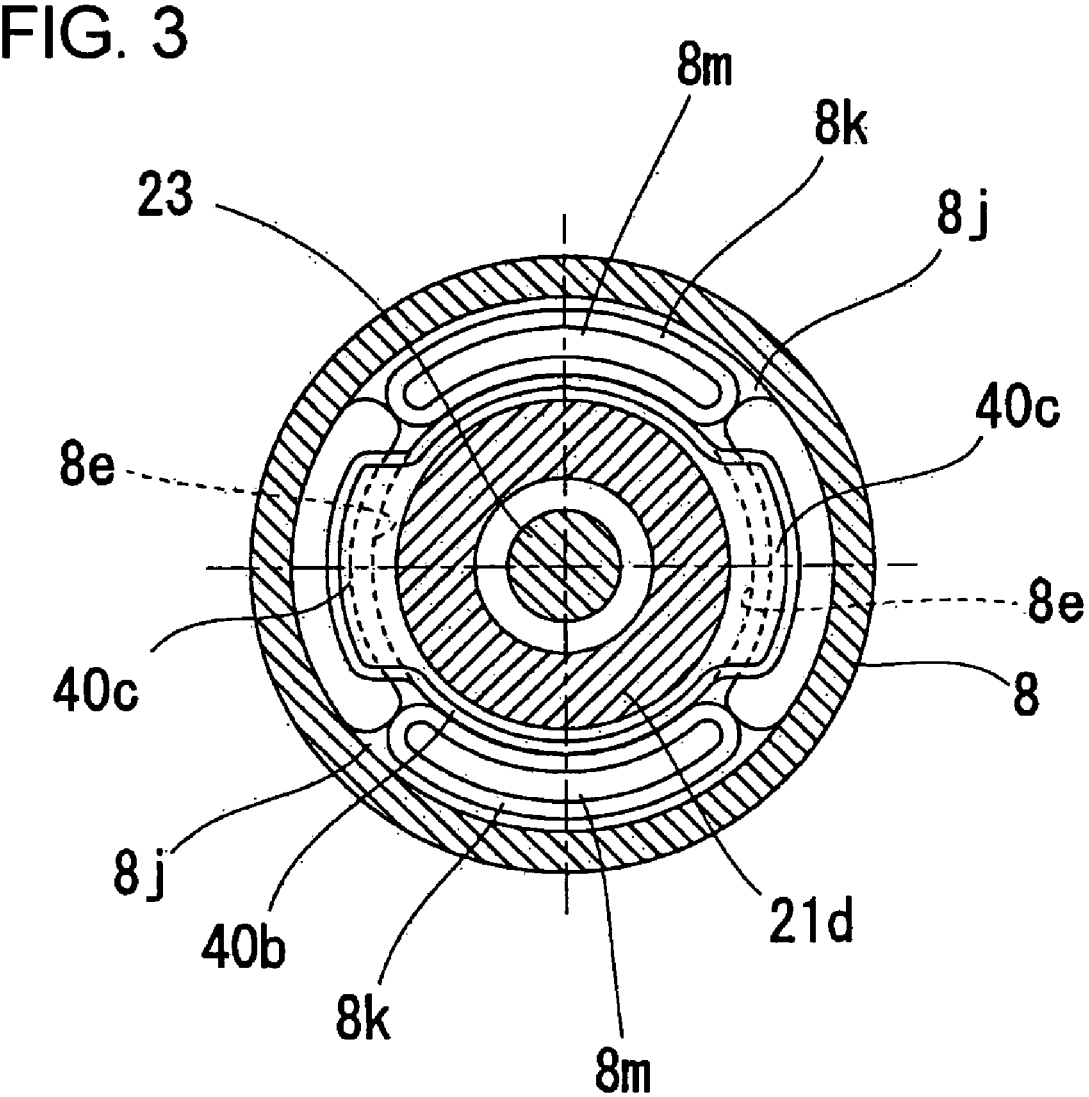
FIG. 3 is a cross-sectional view taken along the line III—III in FIG. 2.

As shown in FIGS. 2 and 3, a valve mechanism 30 is further provided for making the variable pressure chamber 6 communicate selectively with the constant pressure chamber 5 and the atmosphere. In the valve mechanism 30, two flat surface portions 8*j* each of which takes the shape of a curved, elongate circle are formed by a cross-section portion of the valve member receiving hole 8*f* and a backward extension portion of the plunger receiving hole 8*e* in the output piston 8. Two first negative pressure valve seats 8*k* protrude from the two flat surface portions of the curved, elongate circular shape to be symmetrical with respect to the axis of the output piston 8. Each first negative pressure valve seat 8*k* is formed on each flat surface portion 8*j* and takes the shape of a closed loop ridge or ledge protruding along the circumference of each ellipse which is curved or crooked along an arc having the center on the axis of the output piston 8. The passages 8*m* surrounded by the first negative pressure valve seats 8*k* pass through the side wall of the output piston 8 to open to the constant pressure chamber 5. An expansion portion 21*d* is formed at the rear end portion of the plunger 21, and an atmosphere valve seat 21*a* is formed on the rear surface of the expansion portion 21*d* to encircle an air leading passage defined by the internal surface of the valve member receiving hole 8*f*. A disc-like valve member 31 is loosely received in the valve member receiving hole 8*f* to be movable in the forward and backward direction. Formed at the forward end surface of the valve member 31 are first negative pressure valves 31*a* of a flat shape, which are contactable with the first negative pressure valve seats 8*k* for bringing the variable pressure chamber 6 selectively into communication with the constant pressure chamber 5 or isolation from the same. From the forward end surface of the valve member 31 protrudes an annular atmosphere valve 31*b* at a location which is smaller in diameter than the first negative pressure valves 31*a*. The atmosphere valve 31*b* is selectively brought into contact and out of contact with the atmosphere valve seat 21*a*, so that the variable pressure chamber 6 is selectively isolated from the atmosphere or is made to communicate with the same.

The rear end of the valve member 31 is connected to an annular holder 35 by means of a bellows 34 enabling the valve member 31 to move in the axial direction. The holder 35 fits in the internal surface of the valve receiving hole 8*f* and is urged by means of the resilient force of a compression spring 36 to be pressured on a stepped shoulder surface formed on the internal surface of the valve receiving hole 8*f*. The compression spring 36 is interposed between a spring shoe (not numbered) protruding from the axial mid portion of the input rod 23 and the holder 35 to urge the input rod 23 and hence, the plunger 21 backward. Another compression spring 37 is interposed between the forward end surface of the holder 35 and the rear end surface of the valve member 31 to urge the valve member 31 forward. The inside of the plunger receiving bore 8*e* is in communication with the variable pressure chamber 6 by way of the rectangular holes 8*i*.

A numeral 40 denotes a valve seat member surrounding the plunger 21, and the backward cylindrical portion 40*a* of the valve seat member 40 is axially slidably fit in the internal surface of the plunger receiving hole 8*e* with a seal element 41 air-tightly provided therebetween. The cylindrical portion 40*a* of the valve seat member 40 is provided at its rear end with second negative pressure valve seats 40*b* surrounding the atmosphere valve seat 21*a*, and the second negative pressure valve seats 40*b* are usually positioned slightly ahead of the first negative pressure valve seats 8*k* so that they do not contact with the valve member 31 usually. As best shown in FIG. 3, the rear end of the cylindrical portion 40*a* of the valve seat member 40 is partly expanded in the radial direction at two positions each of which is circumferentially different from the first negative pressure valve seats 8*k*, that is, circumferentially between the two first negative pressure valve seats 8*k*, and the second negative pressure valve seats 40*b* define main air leading portions 40*c* at the two expanded portions thereof. A spring member 43 is provided for urging the valve seat member 40 so that the second negative valve seats 40*b* are positioned to come closer to the valve member 31 than the first negative valve seats 8*k* do. The spring member 43 is interposed between an annular protrusion 40*h* which is protruded at the outer surface of the cylindrical portion 40*a* of the valve seat member 40 and another annular protrusion which is protruded from the internal surface of the plunger receiving hole 8*e*.

The valve seat member 40 is provided at its forward end portion with an annular engaging portion 40*d* which is slidably fit on a large diameter portion formed on the forward end rod portion 21*b* of the plunger 21. The engaging portion 40*d* and the cylindrical portion 40*a* are joined by two linking portions 40*e*. At the radial opposite sides of the forward end rod portion 21*b*, the two linking portions 40*e* are put between the both straight portions of the key member 22 taking the shape of "H" letter and is prevented from coming off in such a manner that a cross beam portion of the key member 22 is kept contacted with one of the liking portions 40*e* while engaging portions formed inner sides of the both straight portions are kept engaged with the outer surface of the other liking portion 40*e*. Thus, the valve seat member 40 is prevented by the key member 22 from rotation, so that the pair of air leading portions 40*c* are held at the same angular phase as the key member 22 to be located between the two first negative pressure valve seats 8*k* in the circumferential direction. The two liking portions 40*e* pass through cutouts formed on the annular protrusion 8*h* and communication grooves to extend from the plunger receiving hole 84 to the latch member receiving hole 8*d*. The communication grooves are axially formed at a fitting portion of the plunger 21 which is fit in the annular protrusion 8*h*.

Further, latch means 44 is provided for latching the valve seat member 40 at an ordinary position against the resilient force of the spring member 43 so that the second negative pressure valve seats 40*b* are separated forward from the valve member 31 beyond the first negative valve seats 8*k*. The latch means 44 includes a pair of latch members 45 which radially inwardly protrude their claw portions 45*a* at the rear end portions thereof, and the claw portions 45a are kept engaged respectively with an annular engaging protrusion which is protruded from the outer surface of the annular engaging portion 40d, thereby to latch the valve seat member 40 at the ordinary position. The latch members 45 are constituted by half-splitting a hollow frustum along a plane passing the axis of the same into two segments. The two latch members 45 composed of the half-split segments are received in the latch member receiving hole 8d as they surround the outer surface of the cylindrical member 18. The latch members 45 are engaged at recess portions 45b formed at the internal surfaces thereof with a protruding portion 18b which protrudes from the outer surface of the cylindrical member 18 to serve as support portion for the latch members 45. A spacer 46 is fit between the base portion outer surface of the latch members 45 and the internal surface of the latch member receiving hole 8d thereby to prevent the latch members 45 from being lifted up away from the protruding portion 18b when turned to move outward. An annular garter spring 47 is fit in an annular groove formed at the outer surfaces of the two latch members 45, so that the same are urged radially inwardly to make the claw portions 45a engage with the annular protrusion 40f.

The latch means 44 includes release means 48 for releasing the valve seat member 40 when the plunger 21 is moved forward larger than a predetermined distance relative to the output piston 8. As the release means 48, a taper surface 21e is formed at the forward end of the large-diameter portion on the forward end rod portion 21b of the plunger 21, and a protrusion with a cam surface 45c is circumferentially formed on the internal surface at axial mid position of each latch member 45. When the plunger 21 is moved forward larger than the predetermined distance relative to the output piston 8, the taper surface 21e is engaged with the cam surfaces 45c, so that the latch members 45 are turned radially outward to make the claw portions 45a unlatch the annular engaging protrusion 40f.

The latch means 44 further includes return means 49 for engaging the claw portions 45a with the annular engaging protrusion 40f to return the valve seat member 40 to the ordinary position when the valve seat member 40 is advanced relative to the output piston 8 in the state that the plunger 21 has not been moved forward larger than the predetermined distance relative to the output piston 8. The return means 49 serves when the output piston 8 is moved backward by the resilient force of the return spring 16 after the key member 22 is brought into abutting engagement with the stepped inner surface of the protruding portion 3a of the rear shell 3 with the rear end of the engaging portion 40d of the valve seat member 40 being in abutting contact on the key member 22. At this time, the valve seat member 40 is moved forward relative to the output piston 8 to bring the taper surface 40g formed at the forward end surface of the annular engaging protrusion 40 into engagement with a cam surface 45c formed at the rear end of each claw portion 45a. Thus, the annular engaging protrusion 40f gets over the claw portions 45a while turning up the latch members 44 against the resilient force of the garter spring 47, until it is then engaged with the claw portions 45a to latch the valve seat member 40 at the ordinary position.

(Operation)

The operation of the negative pressure type booster device as constructed above in the first embodiment will be described hereinafter. When the brake pedal 25 is stepped on thereby to cause the input rod 23 to advance the plunger 21 against the resilient force of the compression spring 36, the valve member 31 is advanced by the resilient force of the compression spring 37. This brings the first negative pressure valves 31a respectively into contact with the first negative pressure valve seats 8k of the curve, elongate closed loop thereby to block the communication between the variable pressure chamber 6 and the constant pressure chamber 5. As the plunger 21 is advanced further, the atmosphere valve seat 21a is separated from the atmosphere valve 31b, whereby the air filtered by the filter element 24 is flown into the variable pressure chamber 6. Thus, the diaphragm 4, the plate 7 and the output piston 8 are moved forward due to the pressure difference between the variable pressure chamber 6 and the constant pressure chamber 5, and the output rod 14 is advanced by the output piston 8 through the reaction member 17 of the reaction mechanism 20. Accordingly, the master piston 13 is pushed forward by the output rod 14, so that pressurized brake oil is generated in the master cylinder 11 in dependence on the stepping force exerted on the brake pedal 25.

The output piston 8 elastically deforms the reaction member 17 by the operating force which corresponds to the pressure difference between the both chambers 5, 6 acting on the diaphragm 4 and pushes the master piston 13 through the reaction member 17 and the output rod 14. When elastically deformed, the reaction member 17 is partly flown into the reaction force hole 18a thereby to push the forward end of the forward end rod portion 21b of the plunger 21 backward. Thus, the plunger 21 is retracted relative to the output piston 8 to make the atmosphere valve seat 21a take seat on the atmosphere valve 31b, whereby the communication of the variable pressure chamber 6 with the atmosphere is blocked to keep a desired pressure of the brake oil. During this operation, the force exerted on the brake pedal 25 is transmitted from the input rod 23 through the rod portion 21b of the plunger 21 to the reaction member 17. Since the reaction member 17 is elastically deformed in dependence on the stepping force, the driver can feel a reaction force corresponding to the deformation of the reaction member 17.

When the brake pedal 5 is released, on the contrary, the plunger 21 is moved by the resilient force of the compression spring 36 backward relative to the output piston 8. Thus, the plunger 21 brings the atmosphere valve seat 21a into contact with the atmosphere valve 31b and moves the valve member 31 backward relative to the output piston 8 against the resilient force of the compression spring 37, whereby the first negative pressure valves 31a are separated from the first negative pressure valve seats 8k. As a result, the negative pressure in the constant pressure chamber 5 is led to the variable pressure chamber 6 by way of the communication passages 8m to make zero the pressure difference between the variable pressure chamber 6 and the constant pressure chamber 5. Therefore, the output piston 8, the plate 7 and the diaphragm 4 are moved backward by the resilient force of the return spring 16 provided in the booster shell 1, and with the backward movement of the diaphragm 4, the master piston 13 is moved backward by the resilient force of a compression spring (not shown) for return to the origin with the result that no pressure of the brake oil is generated in the master cylinder 11.

In this particular embodiment, it becomes easier to set or design the circumferential length of each first negative pressure valve seat 8k and the area through which the differential pressure between the constant pressure chamber 5 and the variable pressure chamber 6 acts on each negative pressure valve 31, as desired to meet the valve characteristic. In addition, it becomes easier to set or design the circumferential length of each first negative pressure valve seat 8k and the area through which the differential pressure between the constant pressure chamber 5 and the variable pressure chamber 6 acts on each negative pressure valve 31, independently of either or both of the diameter of the atmosphere valve seat 21$a$ and the diameter of the atmosphere valve 31$b$ or the effective pressure receiving diameter of the bellows 34. Therefore, the air discharge from the variable pressure chamber 6 to the constant pressure chamber 5 can be performed through the valve operation which is highly responsive and silent. Furthermore, it becomes also realized to set the pedaling force to an appropriate load by properly changing the force acting on the valve member 31 or to set the pedaling operation to be done speedily by decreasing the reaction force generated when the valve seat member 40 pressures the valve member 31 backward.

The plunger 21 is stopped at the same time as the key member 22 is brought into contact with a stepped internal surface of the protruding portion 3$a$ of the rear shell 3, while the output piston 8 is stopped in contact with the key member 22. Thus, while the brake is not applied, the first negative pressure valves 31$a$ remain very close to the negative pressure valve seats 8$k$, so that when the brake begins to be applied, the first negative pressure valves 31$a$ can quickly come into contact with the first negative pressure valve seats 8$k$ as soon as the valve member 31 moves forward. Further, since the key member 22 is relatively slidable along the rectangular holes 8$i$ with itself straddling the two linking portions 40$e$, the valve seat member 40 can be positioned against rotation relative to the output piston 8, so that the air leading portions 40$c$ can be reliably held between the two first negative valve seats 8$k$ in the circumferential direction.

In the event of an emergency braking that the driver steps on the brake pedal 25 quickly, a large jumping characteristic takes place whereby a propelling force which is larger than that at the time of the ordinary braking is output to the output member 14. More specifically, the jumping characteristic according to which the ratio of the output to the input is increased to the infinity at the time of the ordinary braking depends on the distance through which the plunger 21 is moved forward until the abutting member 19 comes into contact with the reaction member 17 after the atmosphere valve seat 21$a$ begins to leave the contact with the atmosphere valve 31$b$ following the abutting contact of the first negative pressure valves 31 with the first negative pressure valve seats 8$k$. At the time of the emergency braking, on the contrary, the second negative pressure valve seats 40$b$ are brought into contact with the second negative valves 31$c$ thereby to move the valve member 31 rearward, as referred to later in detail. Thus, the distance through which the plunger 21 is moved forward until the abutting member 19 comes into contact with the reaction member 17 after the atmosphere valve seat 21$a$ begins to leave the contact with the atmosphere valve 31$b$ becomes longer than that at the time of the ordinary braking, and the distance through which the first atmosphere valve seats 21$a$ leave the contacts with the first atmosphere valves 31$b$ during the same time also becomes longer. Accordingly, the variable pressure chamber 6 is made communicate with the atmosphere quickly and compulsorily, so that a propelling force which is larger than that at the time of the ordinary braking is output to the output member 14 to heighten the jumping characteristic.

When the plunger 21 is moved forward relative to the output piston 8 more than the predetermined distance at the time of the emergency braking, the taper surface 21$e$ of the release means 48 pressures the cam surfaces 45$c$ and turns the latch members 45 to make the claw portions 45$a$ come off from the annular engaging protrusion 40$f$, whereby the latch members 45 are turned to release the valve seat member 40. Thus, the valve seat member 40 is moved backward by the resilient force of the spring member 43 a predetermined distance relative to the output piston 8, and the second negative pressure valve seats 40$b$ are brought into contact with the second negative pressure valves 31$c$ to move the valve member 31 backward while separating the atmosphere valve 31$b$ from the atmosphere valve seat 21$a$. The retraction of the valve seat member 40 relative to the output piston 8 is prevented when the rear end of the engaging portion 40$d$ is brought into contacts with the key member 22 which is in abutting contact with the rear end surfaces of the rectangular holes 8$i$. This causes the variable pressure chamber 6 to be brought into communication with the atmosphere quickly and compulsorily. Thus, a larger propelling force than that at the time of the ordinary braking is output to the output member 14, so that a sufficiently high pressure of the brake fluid is output from the master cylinder 11. Upon increase in the output, the reaction member 17 is partly flown into the reaction force hole 18$a$ to press the plunger 21 backward. This brings the atmosphere valve seat 21$a$ into contact with the atmosphere valve 31$a$ to prevent the air from flowing therefrom, so that the output at the time of the emergency braking can be determined.

When the brake pedal 25 is released, the plunger 21 is moved backward by the resilient force of the compression spring 36 relative to the output piston 8 and the valve member 31. Thus, the second negative pressure valves 31$c$ are separated from the second negative pressure valve seats 40$b$ to bring the variable pressure chamber 6 into communication with the constant pressure chamber 5. As a result, the booster output is lowered to permit the output piston 8 is moved backward by means of the return spring 16. When the output piston 8 is retracted by the resilient force of the return spring 16 following the abutting contact of the key member 22 with the stepped portion internal surface of the protruding portion 3$a$ of the rear shell 3, the valve seat member 40 which has been held with the rear end of the engaging portion 40$d$ being in contact with the key member 22 is advanced relative to the output piston 8. Thus, through the engagement of the taper surface 40$g$ at the forward ends thereof, the annular engaging protrusion 40$f$ causes the latch members 45 to spread against the resilient force of the garter spring 47 thereby to get over the claw portions 45$a$. After getting over the claw portions 45$a$, the latch members 45 are turned back by means of the resilient force of the garter spring 47 to be brought into engagement at the claw portions 45$a$ with the annular engaging protrusion 40$f$, so that the valve seat member 40 is held or latched at the original or ordinary position therefor.

Second Embodiment

Figure 4:
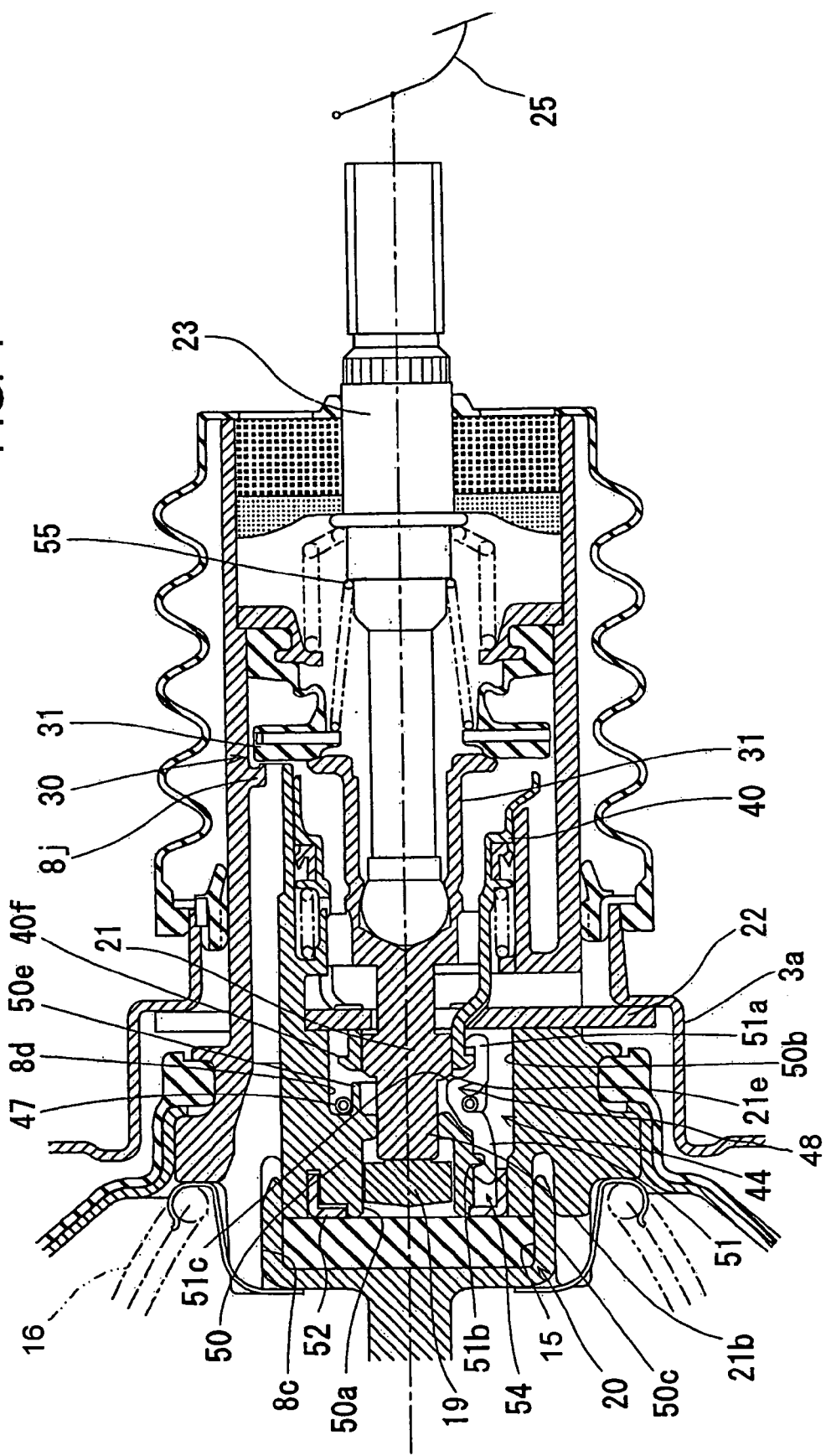
FIG. 4 is an enlarged fragmentary sectional view of another valve mechanism in the second embodiment according to the present invention.

Next, the second embodiment according to the present invention will be described hereafter. The second embodiment whose valve mechanism is shown in FIG. 4 is different from the first embodiment in the construction of the latch means 44 for latching and unlatching the valve seat member 40 as well as in the arrangement position of the compression spring 37 for urging the valve member 31 forward. Since other parts in the second embodiment are same as those in the first embodiment, the detailed description for such other parts is omitted in exchanger of assigning the same reference numerals to the same parts. In the second embodiment shown in FIG. 4, the output piston 8 is bodily provided therein with a partition wall 50 between the reaction force chamber hole 8c and the engaging member receiving hole 8d, and the forward end surface of the partition wall 50 defines the bottom surface of the reaction force chamber 15. The partition wall 50 is provided with the reaction force hole 50a from the forward end surface of the partition wall 50 on the axis of the output piston 8. The forward end rod portion 21b of the plunger 21 is slidably inserted into the bottom portion of the reaction force hole 50a to extend into the same, and the plunger 21 is held with its forward end surface being kept in contact with the rear end surface of the abutting member 19 slidably received in the reaction force hole 50a.

The latch means 44 includes a plurality of attaching holes 50b which are formed in the partition wall 50 around the reaction force hole 50a to pass through axially. The latch members 51 are received respectively in the attaching holes 50b. The claw portions 51a, radially inwardly protruded at the rear end portion of the latch members 51, are urged to come into engagement with the annular engaging protrusion 40f of the valve seat member 40 thereby to position the valve member 40 at the ordinary position. At a radially inner surface of each attaching hole 50b, there is protruded a projection portion 50c serving as support portion, with which the latch member 51 is engaged at a hollow portion 51b formed at the inner side of the base portion thereof. An annular recess (not numbered) is formed at the forward end surface of the partition wall 50 to be joined partly with the outer side surface of the attaching holes 50b, and a cover 52 as annular member taking the shape of L-letter cross-section is fit at its cylindrical portion into the annular recess. Thus, the front wall portion of the cover 52 closes the attaching holes 50b to define the same flat surface as the forward end surface of the partition wall 50 and together with the same, defines the bottom surface of the reaction force chamber 15. The cylindrical portion of the cover 52 are interposed between the outer side surfaces of the latch members 51 and the outer side surfaces of the attaching holes 50b and prevents the hollow portions 51b of the latch members 51 from floating from the projection portions 50c when the latch members 51 are turned radially outwardly. The projection portion 50c protruded on the inner side surface of each attaching hole 50b and the hollow portion 51b formed at the base portion of each latch member 51 and engaged with the projection portion 50c constitute joint means 54 for jointing the inner side surface of each attaching hole 50b with the base portion of each latch member 51 so that each latch member 51 can be turned radially outwardly.

An annular garter spring 47 is fit in circumferential grooves formed on the outer surfaces of the plural latch members 51 while being hung over a cylindrical wall 50e. The cylindrical wall 50e is formed on the rear end surface of the partition wall 50 and is partly cutout at those corresponding to the attaching holes 50b. Thus, each latch member 51 is urged radially inwardly to bring the claw portion 51a into engagement with the annular engaging protrusion 40f. Like that in the foregoing first embodiment, the release means 48 enables each latch member 51 to turn radially outwardly through the engagement of the taper surface 21e of the plunger 21 with the cam surface 51c formed on each latch member 51 when the plunger 21 is moved forward more than the predetermined distance relative to the output piston 8, and disengages the claw portion 51a of each latch member 51 from the engaging protrusion 40f accordingly. Return means (not numbered) is also provided to serve in the same manner as that 49 in the foregoing first embodiment. That is, when the output piston 8 is retracted by the resilient force of the return spring 16 following the abutting contact of the key member 22 with the stepped portion internal surface of the protruding portion 3a of the rear shell 3, the valve seat member 40 which has been held with the rear end of its engaging portion (not numbered) being in contact with the key member 22 is advanced relative to the output piston 8. Thus, the annular engaging protrusion 40f causes the claw portions 51a to spread out and to get over the annular engaging protrusion 40f and is brought into engagement with the claw portions 45a.

In the foregoing first embodiment, the valve member 31 is urged forward by means of the compression spring 37 interposed between the valve member 31 and the annular holder 35 which is connected to the valve member 31 through the bellows 34. In this second embodiment, on the contrary, the valve member 31 is urged forward by means of a compression spring 55 interposed between the valve member 31 and a stepped portion of the input rod 23.

Third Embodiment

The third embodiment whose valve mechanism is shown in FIG. 5 is different from the second embodiment in that a leaf spring 53 is employed to urge each latch member 51 in such a direction as to bring the claw portion 51a thereof into engagement with the annular engaging protrusion 40f. As shown in FIG. 5, the leaf spring 53 is secured at an annular base portion thereof to the back surface of the end surface portion of the cover 52 and extends each blade or leaf spring portion into each attaching hole 50b in the axial direction of the output piston 8. Each leaf spring portion is held pressured on the radial outer surface of each latch member 51, so that the same can be urged to bring the claw portion 51a thereof into engagement with the annular engaging protrusion 40f of the valve seat member 40.

Finally, various features and many of the attendant advantages in the foregoing embodiments will be summarized as follows:

In the first embodiment typically shown in FIG. 2, since the first negative pressure valves 31a, the second negative pressure valves 31c and the atmosphere valve 31b are formed on the valve member 31 to reside almost within the common plane normal to the axis of the output piston 8 and since the valve member 31 is simplified in construction and is downsized and lightened, the negative pressure type booster device can be downsized and lightened and in particular, can be shortened in its whole axial length. In addition, when the valve seat member 40 is moved backward by the spring mmember 43 at the time of an emergency braking, the second negative pressure valve seats 40b are brought into contact with the second negative pressure valves 31c thereby to quickly move the valve member 31 backward. Thus, the atmosphere valve 31b can be separated from the atmosphere valve seat 21a to make the variable pressure chamber 6 communicate with the atmosphere quickly and compulsorily, so that a sufficiently larger fluid pressure than that in the ordinary state can be generated in the master cylinder 11. Further, since the passages 8m are provided in the cylindrical portion 40a to make the variable pressure chamber 6 communicate with the constant pressure chamber 5, since the first negative pressure valve seats 8k are protruded in the closed loop shape at the rear end portion where the passages 8m face the valve member 31 and since the first negative pressure valves 31a contactable with the first negative pressure valve seats 8k are formed on the valve member 31, the circumferential length of each first negative pressure valve seat 8k and the area through which the pressure difference between the constant pressure chamber 5 and the variable pressure chamber 6 acts on the valve member 31 can be easily set or designed to meet the valve characteristic. Further, since the circumferential length of each first negative pressure valve seat 8k and the area through which the pressure difference between the constant pressure chamber 5 and the variable pressure chamber 6 acts on the valve member 31 can be set or designed independently of the diameter of the atmosphere valve seat 21a and the like, the discharge of the air from the variable pressure chamber 6 to the constant pressure chamber 5 can be performed through the operation which is highly responsive and silent. In addition, it can be realized to set the load at the start proper by properly altering the force acting on the valve member 31, and it can be also realized to perform quick braking operation by decreasing the reaction force which is generated when the valve seat member 40 pushes the valve member 31 backward.

Also in the first embodiment typically shown in FIG. 3, the second negative pressure valve seats 40b defining the air leading portions 40c are constituted by partly enlarging the valve seat member 40 in the radial direction at angular positions distanced the predetermined angle from the first negative pressure valve seats 8k in the circumferential direction. Since the air leading portions 40c are provided at the second negative valve seats 40c by partly enlarging the valve seat member 40, the following advantage can be attained. That is, when the second negative valve seats 40c are brought into contact with the second negative valves 31c thereby to move the valve member 31 backward at the time of the emergency braking, the atmospheric air flown thereinto from between the separated atmosphere valve 31b and valve seat 21a is admitted through the air leading portions 40c in such a manner that such air flow is highly responsive as well as silent.

Also in the first embodiment typically shown in FIG. 2, since the latch members 45 are engaged at the latch base portions thereof with the support portion 18b integrally formed on the output piston 8 and are engageable with the valve seat member 40 at the claw portions 45a, the accuracy in the relative displacement of the valve seat member 40 relative to the valve member 31 can be improved. Further, since the latch members 45 are received in the latch member receiving hole 8d formed in the base portion 8a of the output piston 8, the base portions of the latch members 45 can be prevented from flowing up from the support portion 18b, so that the fluctuation in the position at which the valve seat member 40 is released from the latch means 44 can be restrained by the simple construction.

In the third embodiment shown in FIG. 5, the leaf springs 53 are employed to urge the latch members 51 toward engagement with the valve seat member 40. Each leaf spring 53 is extended backward from the base portion side and at the portion behind the support portion 50c, urges the latch member 51 toward engagement with the valve seat member 40. Since the latch members 51 are urged by the leaf springs 53 toward engagement with the valve seat member 40, the same can be latched at the ordinary position by the latch means 44 which is reliably in operation and low in cost to manufacture.

Although in the illustrated embodiments, the first negative pressure valve seats 8k, the first negative pressure valves 31a, the passages 8m, the second negative pressure valve seats 40b, the second negative valves 31c, the air leading portions 40c and the latch members 45 (51) are provided at diametrically opposed both sides in terms of better pressure balance, they may be provided at only one side in the radial direction.

Obviously, numerous modifications and variations of the present invention are possible in light of the above teachings. It is therefore to be understood that within the scope of the appended claims, the present invention may be practiced otherwise than as specifically described herein.

What is claimed is:

1. A negative pressure type booster device comprising:
  a booster shell having a partition member partitioning the interior thereof into a variable pressure chamber and a constant pressure chamber;
  an output piston secured to said partition member at a base portion thereof and having a first negative pressure valve seat formed thereon;
  an output rod;
  a reaction mechanism for transmitting the output depending on the pressure difference between said variable and constant pressure chambers, from said output piston to said output rod;
  a plunger operable in connection with said reaction mechanism and having an atmosphere valve seat formed thereon;
  an input rod connected to said plunger for axially moving said plunger when axially moved by a brake pedal;
  a valve member having a first negative pressure valve and an atmosphere valve formed thereon, said first negative pressure valve being contactable with said first negative pressure valve seat for selective communication of said variable pressure chamber with said constant pressure chamber, said atmosphere valve being contactable with said atmosphere valve seat for selective communication of said variable pressure chamber with the atmosphere;
  a valve seat member having a second negative pressure valve seat formed thereon and inserted air-tightly and slidably into a cylindrical portion which is formed in said output piston at a position ahead of said valve member;
  a resilient member urging said valve seat member backward relative to said output piston;
  said valve member having a second negative pressure valve thereon which is contactable with said second negative pressure valve seat for communication of said variable pressure chamber selectively with said constant pressure chamber or with the atmosphere;
  a latch arranged for latching said valve seat member to said output piston against the force of said resilient member urging said valve seat member backward when the relative forward distance of said plunger relative to said output piston is smaller than a predetermined value, but for unlatching said valve seat member from said output piston for a power increase at the time of emergency braking when the relative forward distance of said plunger relative to said output piston is larger than said predetermined value; wherein:
  a passage making communication between said constant pressure chamber and said variable pressure chamber is formed in said cylindrical portion to open at the rear end surface of said cylindrical portion;
  said first negative pressure valve seat takes the shape of a closed loop and protrudes from the rear end surface of said cylindrical portion to encircle the rear end of said passage;
  said first negative pressure valve, said second negative pressure valve and said atmosphere valve contactable respectively with said first negative pressure valve seat, said second negative pressure valve seat and said atmosphere valve seat are formed on said valve member to reside substantially within a common plane normal to the axis of said output piston; and said valve seat member is partly enlarged in the radial direction at an angular portion distanced circumferentially from said first negative pressure valve seat thereby to define an air leading portion at said second negative pressure valve seat.

2. The negative pressure type booster device as set forth in claim 1, wherein said latch comprises:
   at least one latch member engaged with said output piston at a latch base portion thereof and engageable with said valve seat member, at a claw portion thereof;
   a latch member receiving hole formed in the base portion of said output piston to receive said latch member therein;
   a support portion formed on said output piston in said latch member receiving hole and engaged with said latch base portion of said latch member;
   another resilient member urging said latch member to be engaged with said valve seat member; and
   a cap member provided between said reaction member and said latch member receiving hole to isolate said reaction member from said latch member receiving hole.

3. The negative pressure type booster device as set forth in claim 2, wherein said another resilient member urging said latch member comprises a leaf spring which extends backward from the base portion of said output piston and makes its portion extending backward from said support portion urge said latch member in a direction toward the engagement with said valve seat member.

4. The negative pressure type booster device as set forth in claim 1, wherein said closed loop forming said first negative pressure valve seat is curved to be elongated circumferentially of said cylindrical portion.

5. The negative pressure type booster device as set forth in claim 4, wherein said latch comprises:
   at least one latch member engaged with said output piston at a latch base portion thereof and engageable with said valve seat member at a claw portion thereof;
   a latch member receiving hole formed at the base portion of said output piston to receive said latch member therein;
   a support portion formed on said output piston in said latch member receiving hole and engaged with said latch base portion of said latch member;
   another resilient member urging said latch member to be engaged with said valve seat member; and
   a cap member provided between said reaction member and said latch member receiving hole to isolate said reaction member from said latch member receiving hole.

6. The negative pressure type booster device as set forth in claim 5, wherein said another resilient member urging said latch member comprises a leaf spring which extends backward from the base portion of said output piston and makes its portion extending backward from said support portion urge said latch member in a direction toward the engagement with said valve seat member.

* * * * *